United States Patent
Chandrasekar

[19]

[11] Patent Number: 6,036,413
[45] Date of Patent: Mar. 14, 2000

[54] HIGH SPEED HYDRODYNAMIC SPINDLE

[75] Inventor: Kugalur S. Chandrasekar, Rockford, Ill.

[73] Assignee: The Ingersoll Milling Machine Company, Rockford, Ill.

[21] Appl. No.: 08/778,175

[22] Filed: Jan. 2, 1997

[51] Int. Cl.[7] .................. B23C 9/00; F16C 37/00
[52] U.S. Cl. ............... 409/231; 384/110; 384/124; 409/135
[58] Field of Search ................. 409/231, 232, 409/234; 483/1; 384/100, 110, 99, 124, 107; 408/240

[56] References Cited

U.S. PATENT DOCUMENTS

| | | | |
|---|---|---|---|
| 3,476,451 | 11/1969 | Schwartzman | 384/100 |
| 3,684,333 | 8/1972 | Flett et al. | 384/110 |
| 3,708,215 | 1/1973 | Wilcock et al. | 384/110 |
| 3,717,392 | 2/1973 | Ennis | 308/5 R |
| 3,781,069 | 12/1973 | Gluchowicz | 308/5 R |
| 3,834,775 | 9/1974 | Tuffias et al. | 308/36.3 |
| 3,843,952 | 10/1974 | Huson | 308/172.5 |
| 3,891,282 | 6/1975 | Tuffias | 308/9 |
| 3,891,283 | 6/1975 | Pruvot | 308/5 R |
| 3,910,651 | 10/1975 | Pearce et al. | 384/99 |
| 3,934,948 | 1/1976 | Pruvot | 308/9 |
| 3,945,692 | 3/1976 | Tsujiuchi | 308/9 |
| 3,989,260 | 11/1976 | Zonkov et al. | 408/240 X |
| 4,090,743 | 5/1978 | Suzuki et al. | 308/9 |
| 4,114,959 | 9/1978 | Christ | 308/3.5 |
| 4,185,878 | 1/1980 | Robert | 308/9 |
| 4,232,913 | 11/1980 | Nilsson | 308/9 |
| 4,285,551 | 8/1981 | Suzuki et al. | 384/100 |
| 4,302,060 | 11/1981 | Nicholas et al. | 308/9 |
| 4,320,926 | 3/1982 | Heinemann et al. | 308/9 |
| 4,322,116 | 3/1982 | Heinemann et al. | 308/9 |
| 4,325,585 | 4/1982 | Sugita | 308/9 |
| 4,371,216 | 2/1983 | Suzuki et al. | 384/118 |
| 4,382,199 | 5/1983 | Isaacson | 310/87 |
| 4,392,642 | 7/1983 | Chitayat | 269/73 |
| 4,474,483 | 10/1984 | Suzuki et al. | 384/114 |
| 4,490,054 | 12/1984 | Kimmelaar | 384/117 |
| 4,538,081 | 8/1985 | Kamiya et al. | 310/90 |
| 4,571,799 | 2/1986 | Chitayat | 29/149.5 A |
| 4,628,238 | 12/1986 | Smulders et al. | 318/653 |
| 4,671,677 | 6/1987 | Heshmat et al. | 384/124 |
| 4,693,642 | 9/1987 | Mair et al. | 408/59 |
| 4,712,031 | 12/1987 | Anderson | 310/90 |
| 4,797,990 | 1/1989 | Yamaguchi et al. | 29/568 |
| 4,797,991 | 1/1989 | Yamaguchi et al. | 29/568 |
| 4,834,559 | 5/1989 | Kalvoda | 384/118 |
| 4,869,626 | 9/1989 | Kosmowski | 408/129 |
| 4,884,899 | 12/1989 | Schwartzman | 384/100 |

(List continued on next page.)

FOREIGN PATENT DOCUMENTS

| | | |
|---|---|---|
| 0 533 526A1 | 8/1993 | European Pat. Off. . |
| 2 507 265 | 12/1982 | France . |
| 1 362 976 | 8/1974 | United Kingdom . |

*Primary Examiner*—William Briggs
*Attorney, Agent, or Firm*—Fitch, Even, Tabin & Flannery

[57] ABSTRACT

A machine tool assembly, and particularly a spindle unit therefor, is provided wherein the spindle unit is relatively small and is designed to run at rotary speeds of between 30,000 rpm's and 40,000 rpm's utilizing hydrodynamic bearings for the spindle shaft. The hydrodynamic bearings are effective to take increased loads versus similarly sized conventional metal-to-metal contacting bearings to provide a very stiff machining system even with the higher loads generated by the increased rotary operating speeds for high speed machining contemplated for the spindle unit herein. The bearings are also designed to use a water-based fluid which is compatible with the cutting fluid. Non-contacting fluid barrier seals limit and control the amount of bearing fluid leaked to the cutting fluid. Due to the compatible nature of the two fluids, small fluid leakage from the bearings will not hurt the cutting fluid. The cutting fluid circulated at an ambient inlet temperature, e.g., 70° F., and leaves at a higher discharge temperature, e.g., 120° F., to cool the spindle and bearings.

7 Claims, 6 Drawing Sheets

6,036,413
Page 2

U.S. PATENT DOCUMENTS

| | | | |
|---|---|---|---|
| 4,927,304 | 5/1990 | Hauser | 409/231 |
| 4,930,910 | 6/1990 | Mori et al. | 384/276 |
| 4,998,033 | 3/1991 | Hisabe et al. | 310/67 R |
| 5,010,794 | 4/1991 | Klager | 82/147 |
| 5,014,581 | 5/1991 | Komanduri et al. | 82/173 |
| 5,022,769 | 6/1991 | Jacobs et al. | 384/118 |
| 5,057,723 | 10/1991 | Umehara et al. | 310/12 |
| 5,089,732 | 2/1992 | Konno et al. | 310/67 R |
| 5,104,237 | 4/1992 | Slocum | 384/12 |
| 5,106,204 | 4/1992 | Dunham | 384/12 |
| 5,140,739 | 8/1992 | Yamaguchi et al. | 483/18 |
| 5,142,173 | 8/1992 | Konno et al. | 310/67 R |
| 5,244,286 | 9/1993 | Chang | 384/118 |
| 5,281,032 | 1/1994 | Slocum | 384/118 |
| 5,322,494 | 6/1994 | Holtey et al. | 483/12 |
| 5,356,225 | 10/1994 | Hanes et al. | 384/100 |
| 5,419,223 | 5/1995 | Kubler et al. | 82/118 |
| 5,448,120 | 9/1995 | Schaule et al. | 310/90 |
| 5,449,236 | 9/1995 | Hori et al. | 384/118 |
| 5,462,364 | 10/1995 | Chandrasekar et al. | 384/111 |
| 5,466,071 | 11/1995 | Slocum | 384/118 |
| 5,484,208 | 1/1996 | Kane et al. | 384/12 |
| 5,488,771 | 2/1996 | Devitt et al. | 29/898.02 |
| 5,697,708 | 12/1997 | Leuthold | 384/110 |

HIGH SPEED HYDRODYNAMIC SPINDLE

FIELD OF THE INVENTION

The invention relates to a machine tool assembly capable of high rotary speeds for cutting while providing a stiff and stable system to give fast and highly accurate cuts. More particularly, the invention pertains to a machine tool assembly including a spindle unit with hydrodynamic bearings which allow for highly accurate and precise machining operations to take place with spindle rotary speeds being in the range of 30,000 to 40,000 revolutions per minute.

BACKGROUND OF THE INVENTION

High speed rotary cutting in machine tools presents several different problems in the design of machine tool assemblies, and particularly the spindles and the bearings utilized therewith. Herein high speed machining operations refers to machine rotary tool speeds in the range of over 30,000 revolutions per minute and up to 40,000 revolutions per minute. Conventional rolling metal-to-metal contacting bearings or ball bearings utilized for spindles limit the rotary speeds at which the spindle can be driven by their DN value which is the product of the bearing inner diameter (D) in millimeters multiplied by the rotary speed of the tool in number of revolutions per minute (N). Larger spindles are typically utilized for handling the increased loads generated by high speed operations. These spindles have greater mass and create higher unit loads on their bearings which are also larger to accommodate the larger spindles and their increased load bearing requirements. Conventional contacting bearings utilized in machine tools have a usual upper limit on their DN value of 1,000,000 so that at larger spindle bearing diameters they are pushed to their limit with respect to their DN value when run at high speed. At these high speeds, special precautions must be taken as to the bearing materials, lubrication and mounting to minimize the effects of increased friction and heat, resulting in increased expense associated with the bearings. Also, during high speed operations, any imperfections in the contacting surfaces of the conventional bearings, such as caused by wear or sudden loads on the spindle, will be magnified and can cause bearing failure. In this regard, efforts have been made to reduce the size of the spindle to correspondingly reduce the diameter of the spindle bearings to more readily allow the spindle rotary speed to be increased, as in U.S. Pat. No. 5,322,494 to Holtey, et al., commonly assigned to the assignee herein. However, even with the smaller spindle design in the '494 Patent, conventional ball bearings, if used in this design at speeds of 30,000 to 40,000 rpm, will wear and eventually fail due to the extreme conditions generated during high speed operations, including increased friction, heat and centrifugal forces on the balls. As the bearings wear, increased levels of vibrations can occur reducing machining accuracy. Vibrations can also cause dings to develop in the contacting metal which, in turn, will cause the ball bearings to rapidly wear. Bearing wear leading to eventual failure and system crashes raises operating costs by the increased production downtime as well as the expenses associated with the required maintenance for rebuilding the bearings.

Thus, it is desirable that with the high speed machining described above of over 30,000 rpm, the spindle of the machine tool have a high load capacity with increased dynamic stiffness for providing stable and accurate operation at the high speeds where contacting bearings will eventually fail. Hydrodynamic fluid bearings are known for use with spindles to provide the spindle with a non-contacting bearing system where fluid is flowed through the bearing so that a self-generating pressure film is developed in the bearing. These pressures can be sufficient to sustain a considerable load and to keep rubbing surfaces of the bearing separated. In fluid bearings, the gradual wear problem experienced with ball bearings is substantially eliminated as there is no metal-to-metal contact when the tool is operated. In addition, catastrophic bearing failure or "crashes" will only occur in extreme instances such as where an unusually large load for a long duration decreases the fluid film to a minimum or the fluid supply fails. This is in contrast to the situation with mechanical contacting ball bearings which can undergo catastrophic failure due to lubrication failures, excessive loads or material failures or breakages of some sort. In addition, momentary overloads can damage the contacting bearings leading to their failure whereas, with fluid bearings, as the bearing clearance is reduced during the momentary overload, the load carrying capacity of the bearing increases. This is due to the "squeeze-film load effect" with these types of momentary overloads. Where the overload is of a very brief duration, e.g., fractions of a second, the fluid that is trapped in the bearing will substantially stay in place because there is not enough time for the fluid film to be squeezed out of the bearing so that as long as a sufficient fluid film is present, there will be no metal-to-metal contact and no failure of the fluid bearing. In this manner, momentary overloads will not effect the fluid bearing at all as opposed to their damaging consequences when contacting roller-type bearings are used.

It is known to form hydrodynamic bearings with a lobe profile as with a cylindrical bearing, where the fluid film has a constant film thickness all around the spindle journal shaft, instability can result unless the load to be taken by the spindle is only unidirectional. With high speed cutting operations of over 30,000 rpm, the design of the lobe profile is particularly critical and is highly dependent upon the application parameters, including the bearing diameter, loads, spindle shaft speeds and the bearing fluid viscosity. The load carrying capacity for hydrodynamic bearings is in direct proportion to the viscosity of the fluid utilized. Taking these considerations into account, the lobe profile has to be designed appropriately so that the lobe portion of the bearings converging from the spindle is not too large so that there is not enough load carrying capacity in the bearing or so small so that there is too much heat generated in the bearing when operated at high speeds. Lack of sufficient load carrying capacity can cause instability and inaccuracies during machining and reduce the life of the bearings or lead to premature bearing failure. High temperatures can cause expansion of the spindle and bearing leading to machining errors caused by thermal deformation of the machine tool components.

As previously mentioned, it is important that the machine tool system have good load carrying capacity and high stiffness for accurate machining even at the high operating speeds contemplated herein. At the rotational speeds of the spindle shaft of over 30,000 rpm, vibrations can be a significant problem with respect to machining accuracy and bearing wear, as earlier discussed, especially if they get to the point where they are in tune with the shaft bending frequency. In this regard, it is desirable to design the hydrodynamic bearing pads to provide the spindle shaft with a high degree of stiffness so as to avoid the onset of high speed resonant vibration of the spindle shaft.

An additional problem with fluid bearings is that where different bearing and cutting fluids are utilized, proper sealing between the different fluids must be present. Thus, when an oil-based bearing fluid is used, any loss of sealing from the cutting fluid, which is typically a water-based fluid, is to be avoided. However, at high rotary speeds of over 30,000 rpm, conventional contacting seals will quickly wear to the point where their sealing function is lost so that contacting seals cannot practically be used at the high operating speeds to seal and isolate the oil-based bearing fluid from the water-based cutting fluid and prevent potential contamination of the cutting fluid with the bearing fluid. Accordingly, it is desirable to provide for high speed machining operations where the seal utilized to keep the bearing fluid from the cutting fluid will not fail at high operating speeds and, if there is any leakage of the bearing fluid into the cutting fluid, it will not hurt the lubrication and cooling functions of the cutting fluid by mixing a different fluid therewith.

The typical tool holder is too large in terms of its mass and size for use with the high speed spindle design herein. In these prior tool mounting arrangements, the cooperating tapers providing on the tool holder and in the spindle were fairly large such that the bearings either had to be too large reducing the speed with which the spindle could be driven, or resulted in a greater cantilever out forwardly from the front bearings on the spindle, increasing the bearing load and instability of the machine tool. Also, with larger size and mass tool holders, the time required for accelerating them up to the desired cutting speed and decelerating them down upon completion of a cutting operation for tool changeover is increased. Where several successive and different machining operations requiring different cutting tools takes place, any lost time such as that due to increased time for accelerating or decelerating the tool to and from the desired speed leads to machining inefficiencies. Accordingly, there is a need for a tool holding system which can be utilized in the present high speed machine tool assembly which is not so large that it cannot be driven at high rotary speeds of operation or generate instability in the tool. The tool holder needs to be able to be coupled to the spindle for stable high speed rotation therewith in a rigid and stiff manner. In addition, the tool holder should be such that it allows for rapid tool changeover on the spindle.

SUMMARY OF THE INVENTION

The machine tool assembly of the present invention includes a spindle unit supported by hydrodynamic bearings for high speed cutting operations at rotary speeds of between 30,000 and 40,000 revolutions per minute ("rpm's") while still providing a stiff and stable system for highly accurate machining at these high speeds. With the present invention, there is no gradual wear of the bearings and the potential for catastrophic bearing failure is substantially reduced. Preferably, the hydrodynamic bearings are in the form of hydrodynamic bearing pads positioned around the forward and rearward ends of the spindle shaft. The bearing pads are supplied with a water-based fluid which is filtered and recirculated through the bearing pads to continually flush and clean the bearing pads and cool the spindle. The hydrodynamic bearing system of the present invention is very forgiving at the high speeds and DN values contemplated for the present machine tool assembly versus conventional bearings which would be pushed to their limit and subject to failure and crashes during such high speed operations. Further, for the diameter used, the hydrodynamic bearings can carry three or four times the load of conventional ball bearings.

Non-contacting, fluid barrier seals are provided on the spindle shaft between the tool and the hydrodynamic bearings so as to minimize leakage of the bearing fluid into the cutting fluid. Water-based bearing fluid is desirable because, in addition to improved heat transfer capabilities and environmental friendliness versus oil-based fluids, the cutting fluid utilized to remove chips from the tool/workpiece interface and for lubrication and cooling of the tool thereat is also a water-based fluid so that the fluids are compatible. Accordingly, any leakage from the bearings to the cutting fluid will not hurt the cutting fluid. In addition, since the bearing fluid is filtered with a finer mesh filter than the cutting fluid, any leakage into the cutting fluid will not introduce contaminates to the cutting fluid. In this manner, the present invention avoids the use of contacting-type seals which would be subject to rapid wear at the high rotary speeds of the spindle herein. Thus, with the present machine tool assembly, the spindle shaft diameter can be relatively small such as, for example, approximately 50 mm or 1.968 inches and the rotary drive for the tool assembly can rotate the spindle at speeds of over 30,000 rpm's up to 40,000 rpm's to provide the assembly herein with DN values of between 1,500,000 and 2,000,000, greatly exceeding that of conventional bearings without risking the functioning or operability of the bearings and contamination of the cutting fluid.

In the preferred form of the invention, the bearing member has front and rear inner inclined surfaces which extend around corresponding spindle outer front and rear flared portions so that the facing sections of the bearing member inner inclined surfaces and spindle outer flared portions cooperate to form the spaced lobed bearing pads. The sections of the bearing member annular surface have a slightly larger radius of curvature than the corresponding facing flared portion sections which provides the pads with their lobe profile. With the spindle shaft diameter preferably sized at 1.968 inches and driven at speeds of up to 40,000 rpm's, the preferred radius of curvature for the bearing member annular surface sections is measured from a point offset approximately 0.004 inches from the center of the spindle flared portion sections along the rotation axis to provide the pads with their canted lobe profile. The preferred difference in curvature of 0.004 inches gives the bearing pads the proper load carrying capacity without sustaining energy losses and creating too much heat in the bearings during high speed operations of the spindle. The heat generated in such high velocity machining is kept within tolerable limits by circulating liquid through the liquid bearings to remove heat from the spindle and bearings. In the example described herein, the heat of the incoming liquid is about 70° F. (an ambient temperature, and about 120° F. when discharging from the tool.

In one form, at least four bearing pads are formed around the spindle shaft at both the front and rear flared portions thereof to minimize vibrations and stabilize the spindle during high rotary speed machining operations. Preferably, five equally-spaced bearing pads are formed around the spindle shaft so as to provide the shaft with high levels of dynamic stiffness and to avoid the onset of harmonic vibrations during high speed machining operations.

A tool receiving mount can be provided at the front of the spindle shaft for receiving and securely capturing the shank of the cutting tool therein with the cutting surface of the tool projecting forwardly of the tool mount for engagement with the workpiece. The tool receiving mount captures the tool shank by either expanding the spindle tool mount or contracting the tool shank so that the tool shank can be inserted into the axial mounting bore of the tool mount whereby subsequent contraction of the mount if expanded or expansion of the shank if contracted causes the application of a clamping force by the mount onto the shank. The tool receiving mount can be provided as an adapter unit which is separate and distinct from the spindle shaft. Preferably, the adapter unit is formed of a material so that it is expanded by heating to between 400° F. to 500° F., whereupon it is shrink-fit tightly onto the mounting shank of the tool. In this manner, the adapter unit becomes an integrated unit with the cutting tool. For rapid tool changeover, different tools can be premounted in their own adapter units which can be placed in a tool magazine or carousel for mounting to the spindle to change cutting tools.

To mount the adapter to the spindle shaft, the spindle shaft includes a mounting bore or socket at its forward end and a hydraulic conduit system for directing high pressure hydraulic fluid to the mounting bore. Upon application of the high pressure fluid into the hydraulic conduit system, the mounting bore is expanded which allows the adapter unit to be pulled and seated in the spindle mounting bore with an anchor tool. When the hydraulic pressure is removed from the bore, the bore surfaces will collapse around the adapter unit so as to tightly couple the adapter unit to the spindle shaft. The hydraulic fluid can be supplied to the conduit system at pressures in the range of 9000 psi to 12,000 psi to expand the bore for insertion of the adapter unit into the bore. When the tool is to be changed by removing the adapter unit from the spindle bore, the anchor tool is utilized to loosen the adapter unit with hydraulic pressure then being applied to the conduit system to once again expand the bore allowing the adapter unit to be removed from the spindle. With the high pressure hydraulics taught herein, a tool change can be effected in approximately one minute.

DETAILED DESCRIPTION OF THE PREFERRED EMBODIMENT

Figure 1:
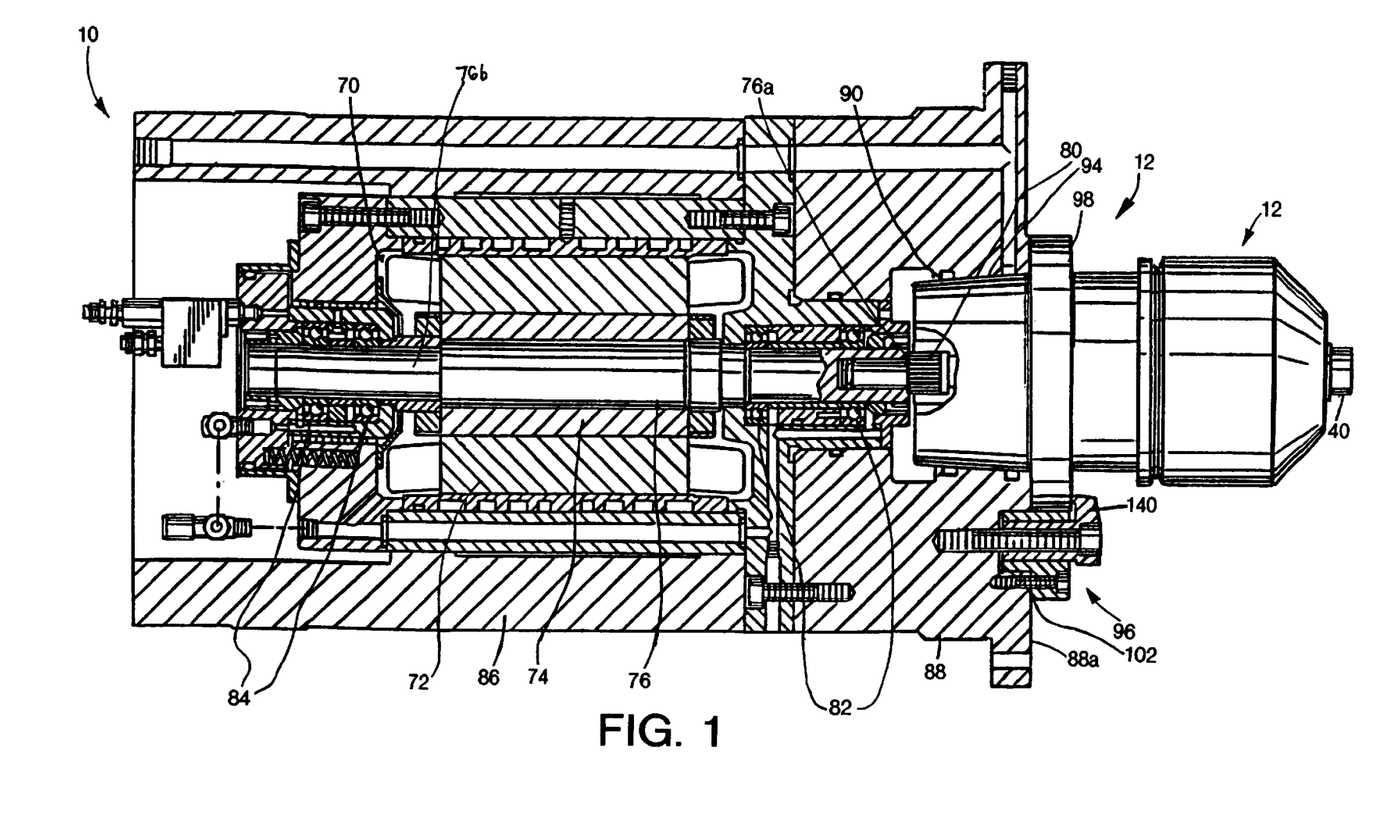
FIG. 1 is an elevational view, partially in section, of the machine tool assembly showing a spindle unit coupled to a rotary drive.

The present invention is directed to a machine tool assembly which has a rotary drive 10 for rotatably driving a spindle unit 12 as shown in FIG. 1 for high speed machining or cutting operations on a workpiece. The spindle unit 12 is adapted for high speed machining operations in the range of 30,000 to 40,000 rpm's and is particularly well suited for use in high speed machine tool assemblies in which the spindle and its rotary cutting tool are carried by driven elements for being rapidly advanced in various directions relative to a workpiece to be machined, such as in the lateral X direction, the vertical Y direction, and the fore and aft Z direction, such as by linear motors.

The spindle unit 12 has a spindle shaft 14 (FIG. 2) having a forward end 14a and a rearward end 14b and extending along its axis of rotation 15. The spindle shaft 14 mounts the cutting tool at its forward end 14a and is driven for high speed rotary cutting operation about its axis 15 by coupling with the rotary drive 10 at its rearward end 14b. To allow the spindle unit 12 of the present invention to be driven at the high rpm's contemplated herein, the bearing member 16 is a hydrodynamic bearing which is designed with a relatively small diameter D (FIG. 5) and with a DN value between 1,500,000 and 2,000,000. With the rotary speed of the spindle shaft 14 being so high, the design of the hydrodynamic fluid bearing pads 18 formed between the bearing member 16 and shaft 14 takes on particular importance. In the present invention, the bearing pads 18 are designed with a canted lobe profile, as best seen in FIG. 6, and which will be more fully described herein.

The bearing pads 18 at both the forward and rearward ends 14a and 14b of the shaft are preferably supplied by a single fluid source or sump 20 (FIG. 2) in which ambient temperature, e.g., 70° F., bearing fluid is held. As the bearing pads 18 are purely hydrodynamic bearings relying for their load carrying capacity on a self-generating pressure film therein and have a preferred minimum operating clearance of 5 microns, the bearing fluid, which is preferably water for reasons discussed hereinafter, is finely filtered down to 2 microns by filter elements 21 of filter 22. The finely filtered water is then pumped by pump 24 into a bearing water entry conduit 26 formed in bearing housing member 28. The bearing water conduit 26 directs the bearing fluid to water channels 30 formed between the bearing member 16 and housing 28 for providing bearing fluid to the bearing pads 18 as more fully described herein. The bearing fluid exits the spindle unit 12 and removes a significant amount of heat from the spindle which is generated during high speed operations thereof for cooling the spindle shaft 14. The exit temperature of the bearing water is approximately 120° F. The hot bearing water is returned to sump 20 where it can be brought down to ambient temperature, re-filtered and re-pumped to the bearing pads 18 at a rate of approximately 3 to 4 gallons per minute during cutting operations with the machine tool assembly. Thus, the pump 24 supplies the bearing pads 18 with cool, filtered and recirculated bearing fluid to continually flush and clean the bearing pads and cool the spindle. In this manner, the bearing pads 18 are kept clean and free from any contaminants that can have deleterious effects on their functioning and load bearing capacity. The hydrodynamic bearings herein have three to four times more load carrying capacity than regular contacting ball bearings of the same diameter. By removing this amount of heat, the effects of metal expansion at high speed operation can be minimized.

Accordingly, the diameter of the spindle shaft 14 and the hydrodynamic bearings 16 can be reduced while taking loads similar to those borne by larger diameter spindles and bearings which allows the spindle shaft 14 to be driven at higher rotary speeds while providing faster and more accurate cutting operations versus these larger prior spindles. The smaller spindle unit 12 of the present invention also reduces the unit load on the bearings so that the hydrodynamic bearings 18 exhibit practically no wear even though run at high rotary speeds. This is due to the hydrodynamic bearings 18 which, under the increased loading caused by high speed operations which, in turn, reduces the clearance and bearing water film thickness, actually has improved and increased load carrying capacity. In fact, the optimum speed in terms of stiffness and load carrying capacity for running the spindle unit 12 herein is between 35,000 and 40,000 rpm's. Rotary speeds below 30,000 rpm's generally are not sufficient for creating the self-generating pressure water film in the present hydrodynamic bearings 18.

At rotary speeds of over 30,000 rpm's, and particularly at the high end speed of 40,000 rpm's, the sealing of the hydrodynamic bearing pads 18 becomes an important consideration. As previously discussed, contacting seals would wear and degrade at the high rpm's with which the present spindle shaft 14 is driven. To avoid this problem, the present invention utilizes fluid barrier seals 32 providing a fluid barrier on the spindle shaft 14 between the bearing fluid pads and cutting fluid. The fluid barrier seals 32 can allow for some controlled bearing fluid leakage from the bearing pads 18 to the cutting fluid as more fully discussed below. The machine tool assembly can be provided with a cutting fluid supply system shown schematically at 34 in FIG. 2. The cutting fluid supply system 34 typically utilizes a water-based fluid combined with a small amount of a water soluble oil additive and can be supplied to the tool/workpiece interface by way of a filter and pump arrangement 36. Preferably, the cutting fluid is 95% water and 5% water-soluble oil and is filtered by the filter elements 37 down to approximately 10 microns.

In order to utilize the non-contacting fluid barrier seal 32 about the spindle shaft which allows some controlled bearing fluid leakage as described above, the bearing member 16 is designed to take a water-based fluid in its bearing pads 18. In this manner, any leakage through the fluid barrier seal 32 of the finely filtered water-based bearing fluid from the bearing pads 18 to the cutting fluid at the tool/workpiece interface will not hurt the cutting fluid system. The cutting fluid can be drawn from sump 38 which is separate from the bearing fluid source 20. Because of the water-based nature of both the bearing and cutting fluids, it is also possible to derive both of these fluids from the same stock fluid for use with the spindle unit 12 of the present invention.

Figure 7A:
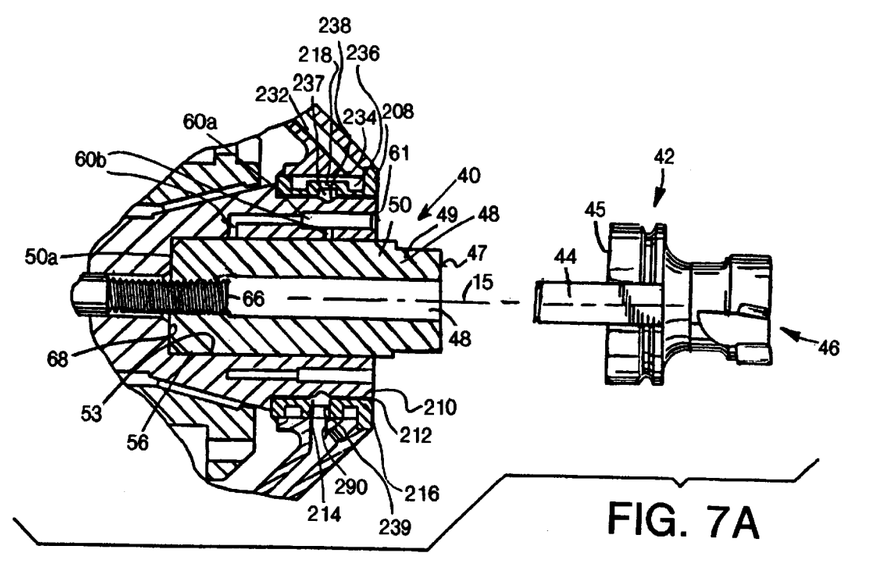
FIG. 7A is an enlarged sectional view of the tool mount of FIG. 2 and a cutting tool with the tool mount in the form of an adapter unit mounted at the front of the spindle shaft for carrying the cutting tool therein.
Figure 7B:
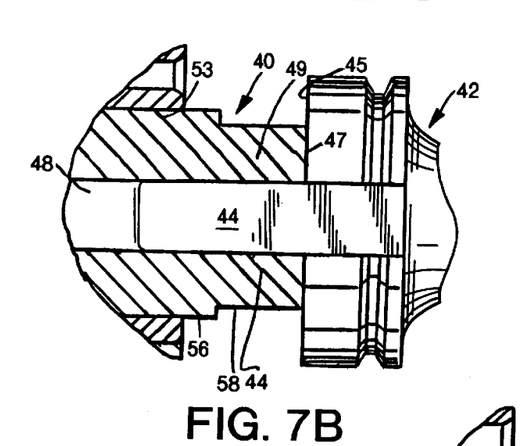
FIG. 7B is an enlarged view of the adapter unit of FIG. 7A expanded for allowing the shank of the cutting tool to be inserted in its axial bore.
Figure 7C:
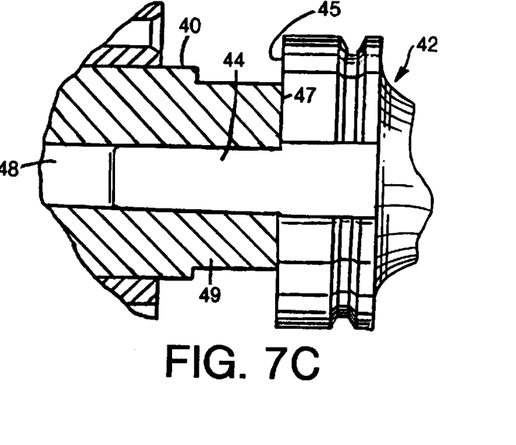
FIG. 7C is a view similar to FIG. 7B showing shrinking of the adapter bore onto the tool shank.

Another feature of the invention is the provision of a tool adapter 40 and attached a cutting tool 42 for mounting in a socket 52 at the end of the spindle shaft 14. Prior tool adapters with their sharply tapered surfaces for fitting in correspondingly tapered spindle sockets resulted in tool adapters that were relatively large, requiring larger diameter bearings reducing the speed at which the spindle could be run. Also, the large size resulted in lower acceleration/deceleration rates for prior spindles in bringing the spindle up to and down from desired operating speeds. The tool receiving adapter 40 herein is smaller than conventional tool adapters and does not require custom manufacturing of tools. The adapter 40 can be utilized with standard off-the-shelf cutting tools 42 such as those having a rear cylindrical threaded mounting shank 44 and cutting surfaces 46 at the front thereof as shown in FIG. 7A. To mount the cutting tool 42 to the tool receiving adapter 40, the adapter 40 can be expanded or the tool shank 44 can be contracted so that the shank 44 can be inserted into the axial throughbore 48 forming a cylindrical wall 49 in the adapter 40. It has been found that expansion of the tool receiving adapter 40 by heating is faster than contracting the tool shank 44, such as by emersion in liquid nitrogen, such that it is preferred to heat the tool receiving adapter 40. Heating of a cylindrical wall 49 of the adapter 40 to between 400° F. to 500° F. will expand the axial bore 48 sufficiently so that the tool shank 44 can be inserted therein, as shown in FIG. 7B. When the high temperature heat is removed from the adapter 40, the cylindrical wall 49 will shrink and clamp down onto the mounting shank 44 for securely gripping and capturing the tool shank 44 therein. Once the shank 44 is captured in the bore 48 of the tool receiving adapter 40 as by an interference fit therebetween, the adapter 40 and cutting tool 42 become integrated with each other so that ready separation of the two requires the reapplication of heat to the tool receiving adapter 40. The tool is precisely positioned on the adapter when circular end wall 45 on the cutting tool 42 abuts outer end 47 on the adapter 40.

When operating at high speeds of 40,000 rpm's or greater, the cylindrical wall 49 tends to expand; and if the shank 44 were threaded into a threaded bore, the threads might become loose. Hence, it is preferred not to use threads for tool retention.

Preferably, the cutting tool 42 and adapter 40 are combined to constitute an adapter unit 50 to be connected to the socket 52 on the spindle shaft. The separate adapter unit 50 is a type of special tool for use in the spindle unit 12 of the present invention. Thus, several different types of standard, commercially available cutting tools each can be pre-mounted into an associated adapter 40 to form adapter units 50 which can be handled by automatic tool changers to facilitate changeover from one cutting tool to the next with the spindle unit 12 herein. Again, utilizing the adapter unit 50 obviates the need to buy or make special tools for fitting with the spindle unit 12 as instead, an off-the-shelf tool 42 can be utilized with an adapter 40 to form an adapter unit 50 for coupling the tool 42 to the spindle shaft 14.

Figure 2:
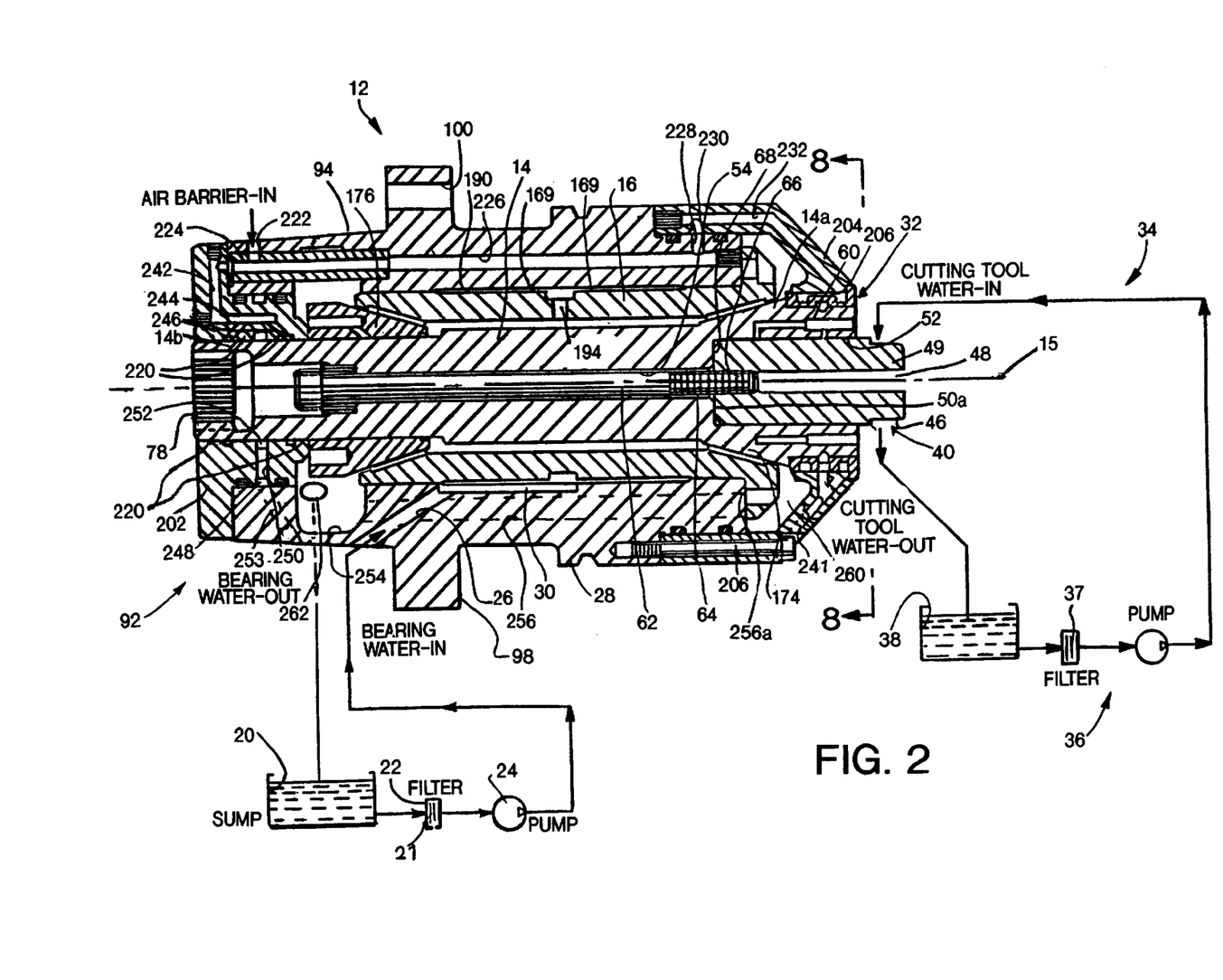
FIG. 2 is an enlarged sectional view of the spindle unit of FIG. 1 showing a bearing member mounted concentrically about a spindle shaft, a tool mount for carrying a cutting tool and fluid sources for the bearing member and cutting fluid system.

The shaft 14 is provided with a mounting socket or bore 52 in its front or forward end 14a having a slightly tapered conical surface which steps down to a smaller anchor tool receiving throughbore 54, as best seen in FIGS. 2 and 7B. The adapter unit 50 has a rear annular surface portion 56 and a smaller diameter front annular surface portion 58 which projects forwardly of the spindle shaft 14 when the adapter unit 50 is mounted in the socket 52. The adapter unit 50 can come in various sizes by changing the outer diameter of the front annular surface portion 58 such as providing it with diameters of 1-inch, ¾ inch and ⅜ inch while keeping the rear annular surface portion 56 the same configuration for fitting into socket 52 and for use with the 50 mm hydrodynamic bearing member 16 and spindle shaft 14 herein. The rear annular surface portion 56 of the adapter 40 can be provided with a slight taper from front to back which substantially matches that of the taper of a rear, bore conical surface 53 for centering of the adapter unit 50 in the spindle shaft, socket bore 52. The cooperating slight tapers of the spindle shaft socket bore 52 and adapter unit 50 keeps the front of the spindle relatively small so that the bearings 18 need not have a large diameter which, in turn, allows the spindle rotary speed in to be increased into the desired range of 30,000 to 40,000 rpm's for the present spindle unit 12. Thus, adapter unit 50 can be positioned close to an adjacent bearing and within the spindle housing and with the tool axially preset, as disclosed in Holtey U.S. Pat. No. 5,322, 494.

The spindle shaft 14 has a hydraulic conduit system 60 for delivering high pressure hydraulic fluid such as in the range of 9000 psi to 12,000 psi to the spindle socket 52. As best seen in FIG. 7A, the conduit system includes an inlet 61 formed in shaft front end 14*a* spaced radially from the socket 52 and leading to axially extending conduit 60*a*. Hydraulic fluid introduced into inlet 61 and axial conduit 60*a* is fed to the socket 52 by way of radial passageways 60*b*. To fit the adapter unit 50 in the socket 52, high pressure hydraulics are applied through the conduit system 60 to expand the socket 54 in diameter. An anchor tool 62 having externally threaded end 64 can be extended through anchor tool receiving bore 54 with the threaded end 64 projecting into the socket 52 for threading engagement into an internally threaded rear portion 66 of the adapter unit throughbore 48. Expansion of the socket 52 with the high pressure hydraulics allows the anchor tool 62 to draw and pull the adapter unit 50 tightly into the socket 52 for seating of a back wall 50*a* of the adapter unit 50 against the annular socket wall 68 formed at the bottom of the socket 52 to bottom the adapter unit 50 in the socket 52, thus setting the axial position of the special tool formed by the unit 50 and off-the-shelf cutting tool 42 as mounted in the socket 52. That is, the tool insertion depth is kept constant when the tool adapter 40 is inserted fully into the socket to abut bottom socket wall 68. Thereafter, the hydraulics are removed from the conduit system 60 so that the adapter 50 is tightly gripped by frictional forces between the slightly tapered socket surface 52 and correspondingly tapered rear annular surface portion 56 of the adapter 50 to secure the adapter 50 in the socket 52 for rotation with the spindle shaft 14.

With the present spindle unit 12 and the hydrodynamic bearings 18 employed therein, high speed cutting operations can be performed with the bearings 18 being effective to take the loads generated by the high speed rotation of the spindle shaft 14 itself and also those due to the responsive forces generated from cutting during the high speed rotary operations of the spindle unit 12. This is possible because, as previously mentioned, the hydrodynamic bearing pads 18 herein have a high DN value and improved load carrying capacities as they are capable of supporting three to four times the load of similarly sized conventional metal-to-metal contacting bearings providing a very stiff machining system even at high rotary cutting speeds. In addition, the bearing pads 18 are designed to utilize water-based bearing fluid so that any slight leakage which may occur from the pads 18 to the cutting fluid which is also a water-based fluid will not hurt the cutting fluid. As a result, fluid barrier seals 32 are utilized as opposed to contacting seals which would degrade under the high rotary speeds of the spindle shaft 14 herein. The mounting of the cutting tool 14 to adapter unit 50 and spindle shaft 14 also allows the diameter of the bearings to be kept relatively small allowing the rotary speed to be increased. Thus, with the higher DN values for the hydrodynamic bearings herein and their improved load carrying capacity, the rotary speed of the spindle unit 12 can be increased to operate in the range of 30,000 to 40,000 rpm's for high speed and highly accurate cutting operations.

The preferred and illustrated embodiment of the rotary drive 10 and spindle unit 12 will now be more fully described herein. Referring to FIG. 1, the rotary drive 10 is an electric motor 70 including a stator armature 72 and a rotor 74 having the drive shaft 76 of the motor 70. The drive shaft 76 is coupled to the spindle shaft 14 by a splined connection. The spindle shaft 14 can be provided with internal splines 78 at its rearward end 14*b* and the drive shaft 76 can be provided with external splines 80 at its forward end 76*a* which mate with the internal splines 78 of the spindle shaft 14 for providing a rigid interconnection and joint therebetween. Conventional metal-to-metal contacting ball bearings 82 and 84 are provided at the front 76*a* and rear 76*b* of the drive shaft 76, respectively. Because the ball bearings 82 and 84 only carry the load of the drive shaft and rotor 74, the ball bearings can be smaller in size than in a conventional integrated motorized spindle unit. That is, conventionally, spindle units are provided in conjunction with the motor so that the spindle shafts will carry the rotor portion of the motor for being driven thereby. Thus, normally in an integrated spindle and motor unit, the bearings for the motor would experience the forces generated by operation of the motor as well as the loads of the spindle. Instead, with the present arrangement where the motor drive shaft 76 has a splined coupling to the rear of the spindle shaft 14, the motor is substantially isolated from those loads experienced by the spindle herein such as the increased centrifugal forces generated at high speed rotation of the shaft, the responsive forces from cutting during machining operations, and excessive loads which can be produced during crash conditions. Instead, those loads are only borne by the hydrodynamic bearing pads 18. Thus, the bearings 82 and 84 herein can be smaller since they only support the drive shaft and rotor and thus do not carry much of a load as the rotor only weighs around 12 pounds. Accordingly, the bearing life is increased and can be expected to be approximately 40,000 hours if properly maintained and lubricated. This also allows the housing cartridge 86 for the motor 70 to be reduced in size which is significant as typically the largest diameter-wise element of the motorized spindle is the motor housing. In this manner, additional space savings are realized with the present spindle unit 12.

For coupling of the spindle unit 12 to the rotary drive, a support and coupling section 88 is provided which includes a central tapered spindle receiving recess 90 formed in its forward face 88*a*. The spindle unit housing member 28 includes a rear housing portion 92 having a rear conical surface 94 designed to be matingly fit into the tapered recess 90. Thus, the spindle unit 12 is mounted in its operative position by inserting the rear conical portion 92 thereof into the tapered recess 90 for aligning and engaging the internal splines 78 of the spindle shaft 14 with the external splines 80 of the motor drive shaft 76.

Figure 9:
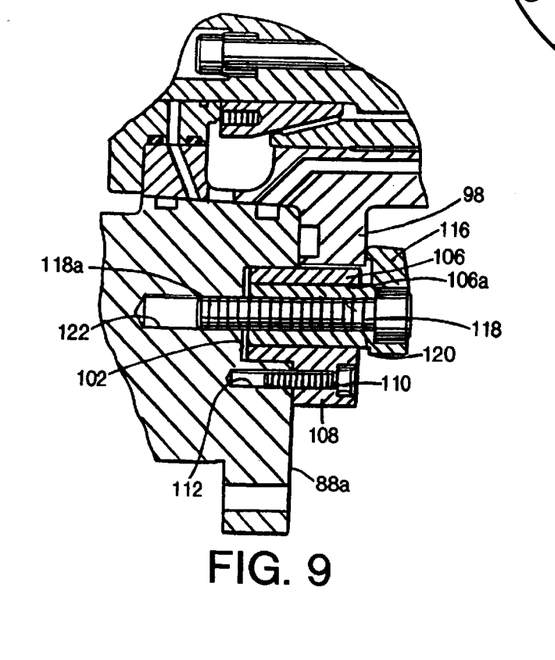
FIG. 9 is an enlarged sectional view of the clamping of the spindle unit to a support and coupling section for connecting the spindle to the rotary drive.

The spindle unit 12 is maintained in operative position coupled to the section 88 by way of clamping mechanism 96, as best seen in FIG. 9. The clamping mechanism 96 cooperates with an annular mounting flange 98 formed on the spindle housing member 28 forwardly of the rear conical portion 94. The clamping mechanism 96 clamps the rear of the mounting flange 98 against the forward face 88*a* of the support and coupling section 88. More specifically, the annular flange 98 is provided with three equally spaced apertures 100. The face 88*a* of the coupling section can be provided with three equally spaced countersunk recesses 102 formed in the face 88*a* around the spindle receiving recess 90 which can receive three clamping mechanisms 96 for clamping of the flange 98 to the face 88*a*. The clamping mechanism 96 includes a clamp mount 104 having a cylindrical body portion 106 and a radially extending portion 108. The body portion 106 fits tightly into the recess 102 with the radial portion 108 drawn into abutting engagement with the support section face 88a by way of threaded fastener 110. The threaded fastener 110 is received in internally threaded axial bore 112 formed in the face 88a radially outward from the recesses 102. The clamp mount portion 106 includes a throughbore 106a into which a clamping device 114 is rotatably fit.

The clamping device 114 has a top radially extending finger portion 116 for engaging the front of the mounting flange 98 and clamping the mounting flange against the forward face 88a of the coupling section 88. A bolt 118 is inserted through an axial throughbore 120 formed in the clamping device 114 with a protruding threaded end 118a projecting into a threaded bore 122 aligned with the throughbore 120 and formed centrally at the bottom of the recess 102. To remove the spindle unit 12, the bolt 118 is loosened to move the bolt end 118a in the bore 122 axially outward allowing the clamping device 114 to be rotated in the cylindrical body portion 106 of the clamp mount 104 so as to rotate the radially extending finger 116 out of engagement with the front face of the flange 98.

Figure 10:
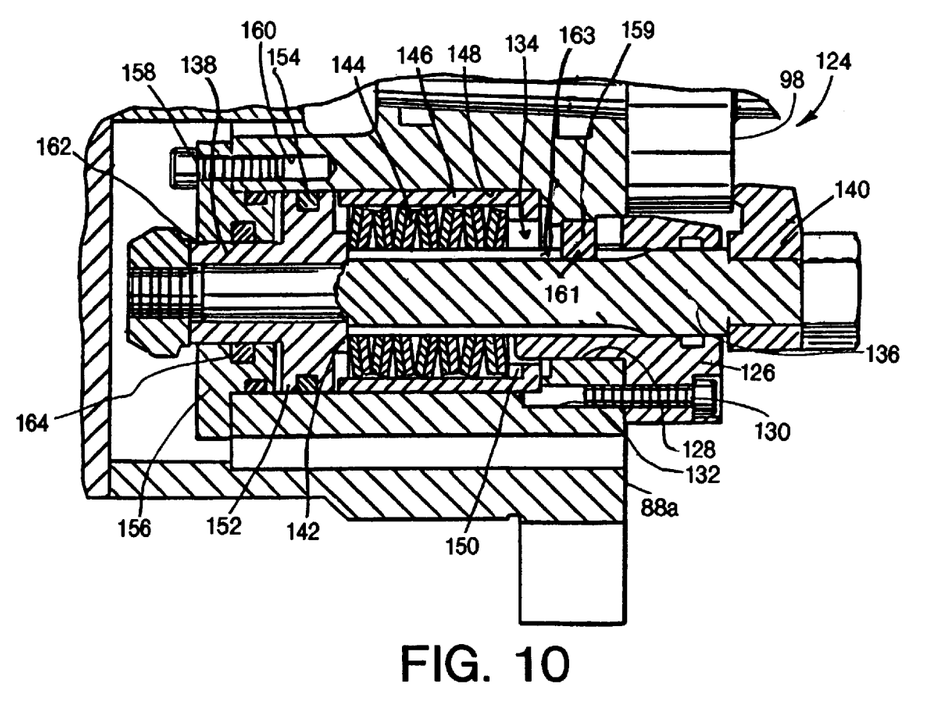
FIG. 10 is a sectional view of an alternative clamping arrangement utilizing an automatic spring clamp mechanism for connecting the spindle unit to the coupling section.

In an alternative arrangement, an automatic spring clamping mechanism 124 can be provided, as shown in FIG. 10. With the automatic spring clamping mechanism 124, there is a clamp mount 126 mounted in a bore 128 of the coupling section 88 by way of threaded fastener 130 screwed into threaded bore 132 spaced radially outward from bore 128. A spring clamping device 134 includes a spring loaded shaft 136 journaled in the bore 128 by rear journal member 138 mounted on the rear end of the shaft 136. A clamping finger 140 is mounted at the forward end of the shaft 136 for engaging the front of the spindle mounting flange 98 and pushing and clamping the back thereof against the front face 88a.

A spring pedestal portion 142 of the rear journal member 138 is provided and engages the rear of spring 144 which is mounted in spring housing 146 with its coils encircling the shaft 136. The spring housing 146 fits tightly in an enlarged diameter portion 148 of the coupling section bore 128. The forward end of the spring 144 abuts a spacer member at the front of the interior of the housing 146. An enlarged diameter flange 152 of the rear journal member 138 is position rearwardly from the spring pedestal portion 142 and is journaled for rotation with respect in the bore section 148 as by bearings 154. With the clamping finger 140 in clamping engagement with flange 98, the front of the flange 152 is spaced slightly from the rear of the spring housing 146, as seen in FIG. 10. To disengage the clamping finger 140 from the flange 98, an axially directed force can be applied to the back of the flange 152 such as by pneumatic pressure applied between the flange and a rear cap member 156 mounted to coupling section 88 by way of fastener 158 and cooperating bore 160. The cap 156 is provided with a central opening 162 in which the shaft rear end is rotatably journaled as by bearings 164. Application of pressure between the cap 156 and flange 152 causes the flange 152 to move axially forward against the bias of spring 144 compressing the spring and allowing the clamp finger 140 to be rotated out of clamping engagement with the spindle flange 98. There are several clamping fingers 140 spaced equidistantly and circumferentially about the flange 98 to retain the spindle unit coupled to the motor drive unit. As best seen in FIG. 10, a circular gear 159, having internal gear teeth 161, cooperates with rack teeth 163 extending longitudinally along the outer circumference of the shaft 136. Thus, as the gear 159 is turned by an air motor or the like (not shown), all of the clamp fingers 140 are simultaneously rotated either to the clamping position shown or to a non-clamping position. The rack teeth 163 allow the shaft 136 to be moved axially, while the rack teeth slide along their respectively engaged gear teeth 161 on the circular gear 159.

Figure 3:
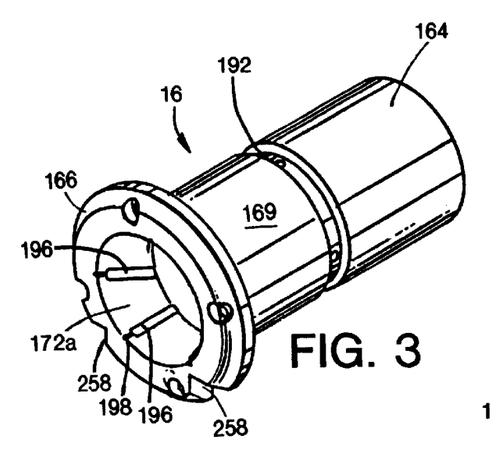
FIG. 3 is a perspective view of the bearing member showing water channels formed therein for supplying the bearing pads with bearing fluid.
Figure 4:
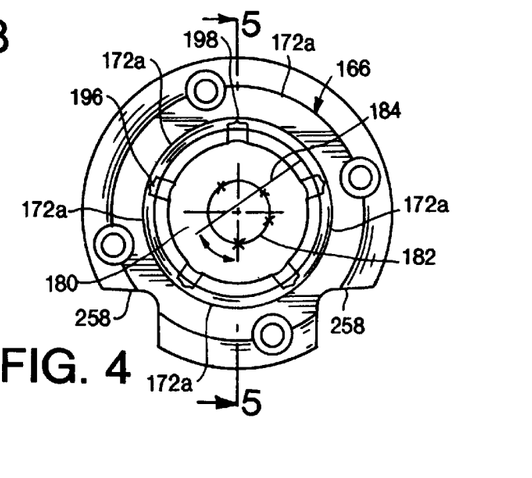
FIG. 4 is a front elevational view of the bearing member of FIG. 3.
Figure 5:
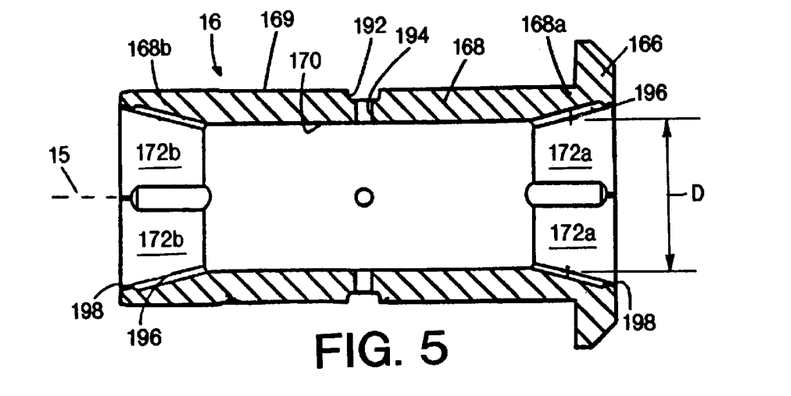
FIG. 5 is a side sectional view of the bearing member taken along line 5—5 of FIG. 4.
Figure 6:
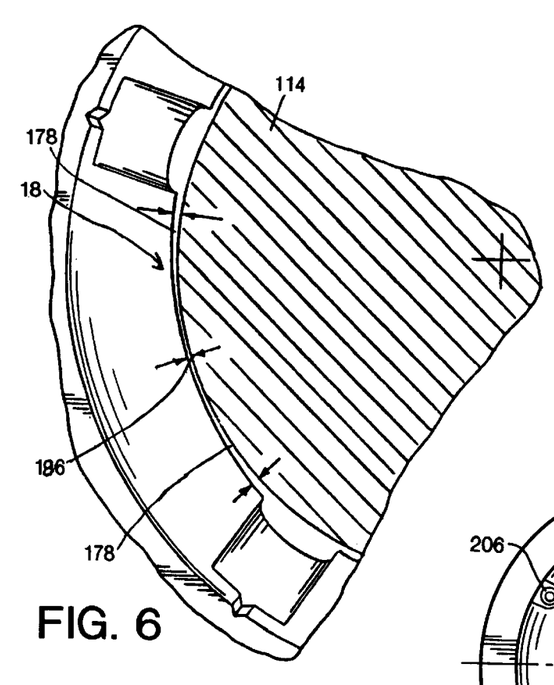
FIG. 6 is an enlarged fragmentary elevational view of a portion of the spindle shaft and a corresponding portion of the bearing member showing the lobed profile of the bearing pads in magnified form.

Referring to FIGS. 3–6, the structure and arrangement of the bearing member 16 and the bearing pads 18 formed thereby will next be more particularly described. The bearing member 16 has a substantially cylindrical body 164 and a forward annular flange 166, as best seen in FIGS. 3 and 4. The body 164 has a cylindrical wall 168 which is integral with the annular flange 166. At both the forward end 168a of the cylindrical wall 168 adjacent the annular flange 166 and the rearward end 168b of the cylindrical wall 168, the inner surface 170 thereof has inclined surfaces 172 formed thereon, as best seen in FIG. 5. The forward inclined surfaces 172a diverge from the interior of the bearing member outwardly away from the axis 15. Similarly, the rear inclined surfaces 172b are tapered and diverge from the interior of the bearing member outwardly away from the center axis 15.

The cylindrical bearing member 16 is mounted concentrically about the spindle shaft 14 and its axis of rotation 15, as shown in FIG. 2. The spindle shaft 14 has forward and rearward flared portions 174 and 176 which cooperate with the inclined surfaces 172a and 172b, respectively, on the bearing member 16 to form the hydrodynamic bearing pads 18 therebetween. The front flared portion 174 of the spindle shaft 14 is preferably integral with the spindle shaft 14, whereas the rear portion 176 is in the form of a rear journal member 178 attached on the shaft 14 at the rear end 14b thereof for rotation therewith.

Both the front flared portion and rear flared portion 174 and 176 bearing member are circular in cross-section about the axis 15. The bearing member inclined surfaces 172a and 172b and the respective spindle flared portions 174 and 176 are formed at an angle of approximately 30° with respect to the longitudinal axis 15. Because of the inclined orientation of the bearing pads 18, the bearings are effective to take both the radial and axial loads of the spindle shaft 14. Whereas the spindle flared portions 174 and 176 are circular about the axis 15, the inclined surfaces 172a and 172b, and more particularly sections thereof which face corresponding sections of the flared portions 174 and 176 are provided with a slightly larger radius of curvature by offsetting their centers from the axis 15 for forming the lobes 178 of the bearing pad. More specifically, for canting of the bearing pad lobes 178, sections of the inclined surfaces 172 are in the form of arcs with their centers being at a point 180 (FIG. 4) located on a reference circle 182 having its center on the axis 15 and of a radius of 0.004 inches. The circle 180 is illustrated as being enlarged greatly from 0.004 inch radius in order to illustrate how the canted lobe is generated. Thus, the radius of curvature for the section arcs of the inclined surfaces 172 is 0.004 inches greater than that of corresponding sections of the spindle flared portions 174 and 176. In addition, it is preferred that there be five hydrodynamic bearing pads 18 formed around the front 14a and rear 14b of the spindle shaft 14 as based on vibration analysis testing and taking into consideration the use of water as the bearing fluid, the use of five bearings as opposed to four is preferred as it has been found that the harmonic vibration level will be reduced in half with five pads versus four so as to reduce and minimize chatter and keep the machining system stiff during high speed operations for accurate and precise cutting operations.

Referring specifically to FIG. 4, the arc sections of the inclined surfaces of the five bearing pads each have their radius started on circle 182 at five equally spaced points 180 therearound. Thus, as can be seen in FIG. 4, the points 180 are spaced at 72° from each other and so that a line drawn from the corresponding originating point 180 on the circle 182 to the inclined surface section includes the radius of the smaller circle 182 which is 0.004 inches offset from the center axis 15 so that their centers 180 do not coincide with the center 15 of the flared portion sections, thus giving the inclined surface sections a larger radius of curvature by 0.004 inches than the corresponding flared portion sections and providing the bearings with a canted lobe profile. With the spindle shaft 14 turning, one pad 18 will always be pre-loading the other adjacent downstream pad as the larger portion of the lobe in the pad immediately upstream from the downstream pad is adjacent the smallest portion of the lobe in the downstream pad where the confronting surface sections of the inclined surfaces and flared portions are at their minimum operating clearance. With the canted lobe profile of the bearing pads of the present invention, the spindle shaft 14 can be run at extremely high rotary speeds in a stiff and stable fashion. In addition, as previously mentioned, the preferred minimum operating clearance is 5 microns so that even with momentary overloads placed on the spindle unit 12, the pressure in the film of water in the bearing pads 18 will be sufficient to support the load and prevent metal-to-metal contact as the water does not have enough time to leave or be squeezed out of the bearing pads 18 due to the "squeeze-film load effect." Therefore, momentary loads do not affect the hydrodynamic bearings 18 herein as opposed to their damaging consequences for conventional contacting bearings.

As previously discussed, to provide the bearing pads 18 with fluid, water is pumped from sump 20 into bearing water entry conduit 26 formed in the bearing housing member 28 at the rear thereof and which is inclined and extends radially inwardly and axially forwardly to water channels 30 formed between an inner surface 190 (FIG. 2) of the housing member 28 and outer surface 169 of the bearing cylindrical wall 168. The axial channels 30 feed water to a circumferential groove 192 (FIGS. 2 and 4) formed intermediate the forward end 168a and rearward end 168b of the bearing member 168. A plurality of radial passageways 194 are formed in the groove 192 and extend through to the inner surface 170 of the bearing wall 168. The spindle shaft 14 has a diameter sized so as to provide some radial clearance between it and the bearing inner surface 170 allowing water to travel from the exit of the passageways 194 axially along the spindle shaft 14 to feeder grooves 196 (FIGS. 4 and 6) formed on the inclined surfaces 172a and 172b of the bearing member. In this manner, cool water is provided surrounding the shaft 14 to cool the spindle proper. Preferably, five feeder grooves 196 are provided around the inclined surfaces 172a and 172b with the five bearing pads 18 formed therebetween. Thus, the feeder grooves 196 get water from between the spindle shaft 14 and the bearing member inner surface 170 and feed the water to adjacent bearing pads 18 on either side thereof. The feeder grooves 196 can be provided with a small V-notch 198 at the end of the bearing member to allow for water flow therethrough and out of the spindle unit 12 back to sump 20, as more fully described herein.

Figure 8:
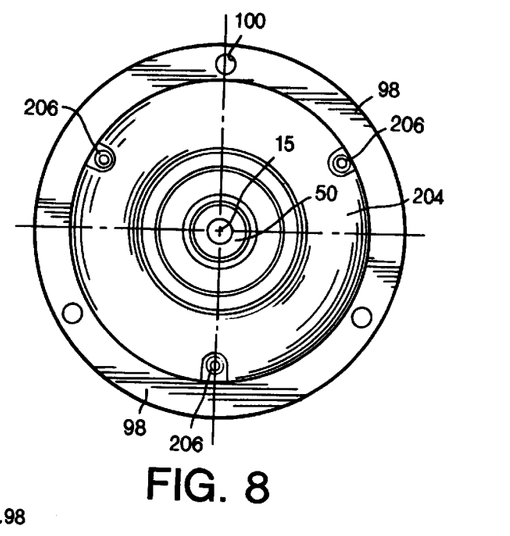
FIG. 8 is a front elevational view of the spindle unit taken along line 8—8 of FIG. 2.

For sealing of the spindle unit 12 and specifically the water from the bearing pads 18, a cap and seal arrangement 200 (FIG. 2) is provided at the front end 14a of the spindle shaft and a rear seal member 202 is provided at the rear end 14b of the spindle shaft 14. The cap and seal arrangement 200 includes cap member 204 attached to the front of the housing 28 by way of fasteners 206, as seen in FIGS. 2, 7a and 8. The cap member 204 has a central opening 206 in which an air barrier labyrinth seal 208 is attached by brazing or welding or the like. The air barrier seal 208 closely fits around an annular nose portion 210 of the spindle shaft front end 14a forwardly of the front flared portion 174 and in which the socket 52 for the adapter unit 50 is formed. When air pressure is applied to the air barrier seal 208 during high speed rotary operations, the air pressure will create an air cushion 212 between the seal 208 and the front shaft nose portion 210 and, more particularly, between axially spaced, radially projecting portions 214 and 216 of the seal 208 which are connected by web 218 and the shaft nose 210. Similarly, the rear seal member 202 has a series of axially spaced, radially projecting portions 220 (FIG. 2) which are provided with a close tolerance fit with respect to the shaft rear end 14b. When air pressure is applied, an air cushion develops between the projecting portions 220 and the shaft rear end 14b similar to air cushion 212. Thus, with the air barrier seals herein, there is no contact between the seals and the rapidly rotating shaft 14 eliminating the wear problems which would be experienced by conventional contacting seal members. Also, for any bearing fluid to leak from the spindle unit 12, it still must pass the various radially projecting portions of the seals 202 and 208 and through the air barrier cushion formed between the seals and the shaft 14.

Referring to FIG. 2, the pressurized air for the seals 202 and 208 enters the spindle unit 12 by way of air entry port 222 formed in the conical surface 94 at the rear of the housing 28. The pressurized air enters an open ended cylindrical plug 224 from which the air is directed axially forwardly to the air barrier seal 208 and rearwardly to the seal member 202. More specifically, the housing member 28 has an axial conduit 226 formed therein aligned with the forward open end of the cylindrical plug 224. At the front of the conduit 226, a radial passageway 228 is formed in the housing member 28 in communication with the axial conduit 226. The radial passageway 228 is aligned with an entry port 230 formed at the back of the front cap member 204. From there, air is directed in the cap member 204 axially forwardly and radially inwardly to the front thereof by axial and radial air channel 232 formed therein. Referring to FIG. 7A, air from the channel 232 is provided to the air barrier seal 208 by exit port 234 aligned with annular cavity 235 formed behind the front radially projecting portion 216 forwardly of web 218. Air from the front cavity 236 flows behind the web 218 to annular rear cavity 236 formed behind the rear annular projecting portion 214 rearwardly of the web 218. From the rear cavity 236, air flows to the annular area 237 between the shaft nose portion 210 and web 218 at which circumferential groove 238 is formed in the shaft nose 210. In the annular area 237, air flows around the shaft nose portion 210 and between its annular surface and the radial projecting portions 214 and 216 and web 218 to develop the air cushion 212 therebetween. Air exits from the seal 208 by outlet port 239 aligned with the entry to small radial passageway 240 formed in the cap member 204. Air leaves the cap member 204 from air outlet 241 in communication with small radial passageway 240.

For the rear seal 202, air leaves the back open end of the cylindrical plug 224 into a radial conduit 242 extending radially inward to an axially extending manifold conduit 244 formed in the seal member 202. From the manifold conduit 244, air is supplied to side circular passageways 246 formed between the radial projections 220 of the seal member 202 and around the rear end 14b of the spindle shaft 14. Air from the conduit 244 is also fed by way of a circular conduit 248 around the rear seal member 202 to a radial passageway 250 axially aligned therewith and extending radially inward to a central circular passageway 252 extending around the spindle shaft rear end 14b intermediate the radially projecting portions 220 and the side circular passageways 246. The central circular passageway 252 is slightly larger than the side circular passageways 246. Thus, pressurized air supplied to the circular passageways 246 and 252 will cause an air cushion to develop between the radially projecting portions 220 and the surface of the shaft rear end 14b. An air outlet 253 is formed at the back of the housing rear conical portion 92 extending from the conduit 248 to the exterior conical surface 94.

The housing rear conical portion 92 has relief section 254 formed between the rear bearing pads and the rear seal member 202, as shown in FIG. 2. Bearing water return passageways 256 are in fluid communication with the relief section 254 and extend axially to the front of the housing member 28. Aligned with the front openings 256a of the passageways 256 are cutouts 258 formed in the front flange 166 of the bearing member 16 (FIGS. 3 and 4). Thus, bearing water will flow from the grooves 196 between the rear bearing pads 18b and out from their outlet notches 198 into the relief section 254 formed in the rear conical portion 92 of the housing member 28. Similarly, bearing fluid will flow from the grooves 196 between the front bearing pads 18a and out of their outlet notches 198 into the space 260 between the back of the cap member 204 and the bearing flange 266 and into the forward openings 256a of the return passageways 256 at the flange cutouts 258. From there, the bearing water will flow back to the relief section 254 where it is removed from the housing 28 by bearing water outlets 262 and returned to the bearing fluid sump 20. In this manner, bearing water is continually circulated through the bearing pads 18.

Thus, for the bearing water to leak to the cutting fluid, the water must escape from the bearing water flow path and not be returned to the relief section 254 and instead must go from the space 260 past the air cushion 212 between the radially projecting portion 214 and the shaft nose portion 210. Any small amounts of fluid that leaks past the radial projecting portion 214 then must also travel past the radial projecting portion 216 and the air cushion 212 formed between it and the shaft nose portion 210 before it can access the cutting fluid. In this manner, the air barrier labyrinth seal 208 presents the bearing fluid with a tortuous path through which it must travel before reaching the cutting fluid at the front of the spindle unit 12, thus limiting and controlling the amount of bearing fluid which leaks from the pads 14 out of the spindle unit 12. As the bearing fluid and cutting fluid are both water-based fluids, the small controlled amounts of bearing water leakage from the spindle unit 12 will not cause problems for the cutting fluid in its various functions, such as for cooling, lubricating and removing chips from the tool/workpiece interface.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. In a machine tool for machining a workpiece at speeds of 20,000 rpm's or greater, the combination comprising:
    a stationary housing;
    a spindle shaft mounted in the stationary housing and for rotating a tool to machine a workpiece at speeds of 20,000 rpm's or greater;
    hydrodynamic fluid bearing members fixed in the stationary housing about the shaft for mounting the spindle shaft for rotation about an axis through the spindle shaft for taking axial and radial loads from the spindle shaft;
    conduits in the housing for delivering and removing liquid bearing fluid from the fluid bearings;
    seals adjacent the fluid bearings and cooperating with the rotating spindle to stop liquid leakage from the fluid bearings; and
    at least one of the fluid bearing members including an inclined surface and the shaft having a facing inclined surface with facing sections on the inclined surface of the bearing member having a larger radius of curvature than the radius of the shaft to form hydrodynamic bearing pads having a canted lobe profile and being inclined to the rotational axis of the spindle to take combined and axial loads from the tool.

2. A machine tool in accordance with claim 1 wherein a pair of the fluid bearings having inclined bearing pads on the spindle shaft, and stationary inclined pads in the housing take the combined radial and axial cutting tool loads.

3. In a machine tool assembly having a rotary drive for rotating a cutting tool at a speed of at least 30,000 rpm's while cutting a workpiece, a spindle unit comprising:
    a stationary housing;
    a spindle shaft mounted in the stationary housing and being driven by the rotary drive to rotate the spindle shaft about its longitudinal axis and to rotate the tool which is connected to the spindle shaft;
    hydrodynamic bearings supporting the spindle shaft for rotation about its longitudinal axis;
    fluid channels in the housing for delivering pressurized bearing fluid to the hydrodynamic bearings;
    floating ring seals encircling the spindle shaft for preventing the outward flow of bearing fluid from the hydrodynamic bearings;
    the floating ring seals having inner, circumferential surfaces spaced from the spindle shaft;
    air flow conduits in the housing for delivery pressurized air to the flow ring seals and thereafter to remove air from the flow ring seals; and
    air flow passageways in the floating ring seals to deliver air to the clearance space between the spindle shaft and the inner surface floating ring seal to keep the ring seals from contacting the spindle shaft and to maintain the seals concentric about the shaft,
    wherein the spindle shaft includes a front flared portion and a rear flared portion and the hydrodynamic bearing pads are spaced circumferentially around the front and rear flared portions to carry both radial and thrust loads of the spindle during cutting operations, and
    the bearing member has front and rear inclined substantially annular surfaces which extend around the corresponding spindle front and rear flared portions with facing sections of the inclined annular surfaces and flared portions cooperating to form the circumferentially spaced bearing pads, the sections of the annular surface having a slightly larger radius of curvature than the corresponding facing flared portion sections to provide the pads with a canted lobe profile.

4. The spindle unit of claim 3 wherein the spindle shaft diameter at the bearing pads is approximately 50 mm; and the radius of curvature of the annular surface sections of each of the pads is from a point offset approximately 0.004 inches from the center of the spindle flared portion sections along the axis of rotation to provide each of the pads with a canted lobe profile wherein the annular surface sections and corresponding flared portion sections have a minimum operating clearance therebetween from which the annular surface sections diverge away from their corresponding flared portion sections.

5. The spindle unit of claim 3 wherein at least four bearing pads are formed around the spindle shaft at both the front and rear flared portions thereof to minimize vibrations and stabilize the spindle at high rotary speeds.

6. The spindle unit of claim 5 wherein five equally spaced bearing pads are formed around the spindle shaft.

7. In a machine tool assembly having a rotary drive for rotating a cutting tool at a speed of at least 30,000 rpm's while cutting a workpiece, a spindle unit comprising:

a stationary housing;

a spindle shaft mounted in the stationary housing and being driven by the rotary drive to rotate the spindle shaft about its longitudinal axis and to rotate the tool which is connected to the spindle shaft;

hydrodynamic bearings supporting the spindle shaft for rotation about its longitudinal axis;

fluid channels in the housing for delivering pressurized bearing fluid to the hydrodynamic bearings;

floating ring seals encircling the spindle shaft for preventing the outward flow of bearing fluid from the hydrodynamic bearings;

the floating ring seals having inner, circumferential surfaces spaced from the spindle shaft;

air flow conduits in the housing for delivery pressurized air to the flow ring seals and thereafter to remove air from the flow ring seals;

air flow passageways in the floating ring seals to deliver air to the clearance space between the spindle shaft and the inner surface floating ring seal to keep the ring seals from contacting the spindle shaft and to maintain the seals concentric about the shaft; and bearing fluid feed means for feeding filtered water through the hydrodynamic bearings at a rate of 3–4 gallons per minute which is supplied to the pads at ambient temperatures of around 70° F. and exits at a temperature of around 120° F. to remove heat from and cool the spindle during a cutting operation.

* * * * *

UNITED STATES PATENT AND TRADEMARK OFFICE
CERTIFICATE OF CORRECTION

PATENT NO. : 6,036,413
DATED : March 14, 2000
INVENTOR(S) : Chandrasekar It is certified that error appears in the above-identified patent and that said Letters Patent is hereby corrected as shown below:

Claim 3, column 16, line 41, change "delivery" to --delivering--.

Claim 7, column 18, line 8, change "delivery" to --delivering--.

Signed and Sealed this

Twenty-seventh Day of February, 2001

Attest:

NICHOLAS P. GODICI

Attesting Officer

Acting Director of the United States Patent and Trademark Office